United States Patent
Acker et al.

(10) Patent No.: US 6,974,003 B1
(45) Date of Patent: Dec. 13, 2005

(54) SPRING-SHOCK ABSORBING SYSTEM WITH TUBULAR ROLLED BELLOWS

(75) Inventors: Bernd Acker, Esslingen (DE); Peter Goennheimer, Weinstadt (DE); Hans-Peter Klander, Stuttgart (DE); Darko Meljnikov, Leinfelden-Echterdingen (DE); Matthias Roemer, Altdorf (DE); Karl-Heinz Roess, Ebersbach (DE); Ruediger Rutz, Koengen (DE); Martin Winkler, Schwaikheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/168,431

(22) PCT Filed: Nov. 11, 2000

(86) PCT No.: PCT/EP00/11182

§ 371 (c)(1),
(2), (4) Date: Sep. 5, 2002

(87) PCT Pub. No.: WO01/46602

PCT Pub. Date: Jun. 28, 2001

(30) Foreign Application Priority Data

Dec. 21, 1999 (DE) .............................. 199 61 719

(51) Int. Cl.⁷ .............................................. F16F 9/24
(52) U.S. Cl. ................ 188/297; 267/64.21; 267/64.24
(58) Field of Search ............................... 188/297, 298, 188/315, 322.2, 322.22; 267/64.11, 64.14, 267/64.19, 64.21, 64.23, 64.24, 64.27, 64.28

(56) References Cited

U.S. PATENT DOCUMENTS

| | | | |
|---|---|---|---|
| 3,222,048 A | * | 12/1965 | Wilkens ................... 267/64.19 |
| 3,815,885 A | | 6/1974 | Moulton et al. |
| 4,722,516 A | * | 2/1988 | Gregg ...................... 267/64.27 |
| 4,941,648 A | | 7/1990 | Kimura |
| 5,009,401 A | * | 4/1991 | Weitzenhof ............... 267/64.21 |
| 5,879,582 A | * | 3/1999 | Havelka et al. ............... 252/77 |

FOREIGN PATENT DOCUMENTS

| | | |
|---|---|---|
| DE | 1 128 310 | 4/1962 |
| DE | 40 18 712 | 12/1991 |
| DE | 196 22 573 | 12/1996 |
| DE | 297 02 927 | 7/1997 |
| DE | 19704433 A1 * | 8/1998 |
| DE | 197 15 580 | 11/1998 |
| FR | 2 422 521 | 11/1979 |

* cited by examiner

Primary Examiner—Pam Rodriguez
(74) Attorney, Agent, or Firm—Kenyon & Kenyon

(57) ABSTRACT

A combined spring/damper system for the support of wheel suspensions or axles on a vehicle body, with a tubular concertina which is mounted between an outer bell and a rolling piston and the meniscus of which is guided on a cylindrical inner-wall region of the outer bell and a cylindrical outer-wall region of the rolling piston. The outer bell or the rolling piston of the displacer is supported between the vehicle body and the chassis in at least one articulated support. The concertina space is filled with a fluid and communicates with a hydraulic accumulator mounted on the chassis side or on the vehicle-body side. Thus, a combined spring/damper system is provided, which includes a low-friction and virtually maintenance-free displacer.

18 Claims, 1 Drawing Sheet

US 6,974,003 B1

SPRING-SHOCK ABSORBING SYSTEM WITH TUBULAR ROLLED BELLOWS

FIELD OF THE INVENTION

The invention relates to a combined spring/damper system for the support of wheel suspensions or axles on a vehicle body, with a tubular concertina which is arranged between a wheel-carrying or wheel-guiding tie-up and a tie-up located on the vehicle-body side and is mounted between an outer bell and an unrolling piston and the meniscus of which is guided on a cylindrical inner-wall region of the outer bell and a cylindrical outer-wall region of the unrolling piston.

BACKGROUND INFORMATION

German Published Patent Application No. 40 18 712 illustrates a spring/damper system with a displacer. However, with respect to a horizontal section, this displacer requires a very large construction space.

Furthermore, German Published Patent Application No. 297 02 927 illustrates a spring/damper system which consists of a displacer without concertina, of a hydraulic accumulator and of a hydraulic line connecting these parts. A mechanical throttle valve is arranged in the hydraulic line. As found with hydropneumatic suspension systems, the displacer connects the vehicle-wheel suspension to the vehicle body. The system is filled with a hydraulic fluid. The latter is displaced through the throttle valve into a hydraulic accumulator during the compression of a vehicle wheel. The flow resistance of the throttle valve generates a damping force, while the compression of the gas volume in the hydraulic accumulator provides a resilient force. In the displacer principle presented here, a displacer piston penetrates into a displacer cylinder. The two parts move frictionally relative to one another in a guiding and sealing gap. The friction is detrimental to the response time of the spring/damper system, so that, in use in a vehicle, there is no optimum rolling behavior of the wheels supported by this system.

SUMMARY

It is an object of the present invention to provide a combined spring/damper system which contains a low-friction displacer which is based on a tubular concertina and which has, along with a slender form of construction, an effective piston area which is invariable over the chassis stroke.

For this purpose, the outer bell or the rolling piston of the displacer is mounted on the vehicle body. Either the outer bell or the rolling piston is fastened on the chassis side or vehicle-body side via a joint having at least one degree of pivoting freedom. The concertina space is filled with a fluid and communicates with a hydraulic accumulator mounted on the chassis side or on the vehicle-body side.

The type of displacer concertina, the type of tie-up on the chassis and on the vehicle body and the filling of the concertina space with a fluid pressurized via a gas makes it possible to have a slender displacer without any mechanical frictional longitudinal guidance. Separate longitudinal guidance is unnecessary, since the pressure in the displacer concertina centers and stabilizes, via the concertina meniscus, the spring-strut parts which are moved relative to one another.

During loading or relieving of the displacer, a hydraulic fluid flows back and forth between the displacer and the hydraulic accumulator via a cross-sectional narrowing in the form of a hydraulic line or of a perforation. The configuration of the line or of the perforation and the nature of the throttle point arranged there influence the system damping via the size and shape of the opening cross section. In this case, the throttle point may be configured either as a nozzle or as a diaphragm or be at least one throttle non-return valve. When throttle non-return valves are used, in each case at least one valve is arranged in the line cross section or perforation cross section for each direction of flow.

The gas cushion of the hydraulic accumulator critically forms the system springing.

By using a tubular concertina, the mechanical friction of the entire system is reduced essentially to the internal friction of the concertina material or diaphragm material. The spring/damper system thereby exhibits a virtually ideal response behavior over the entire spring and damper constant range.

DETAILED DESCRIPTION

Figure 1:
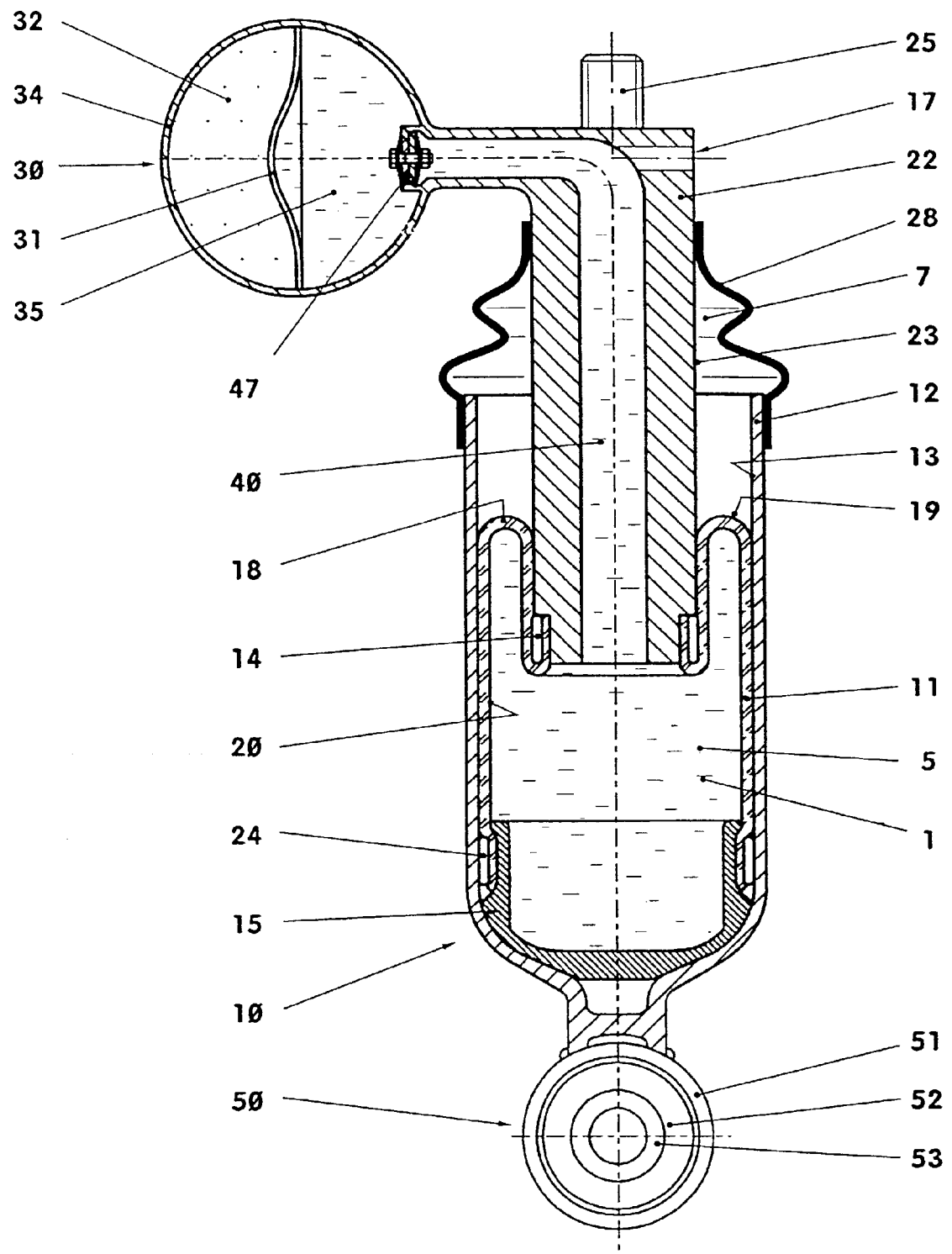
FIG. 1 illustrates a spring/damper system with a tubular concertina.

FIG. 1 illustrates a combined spring/damper system which comprises a displacer 10, a hydraulic accumulator 30 and a fluid-carrying working line 40 arranged between these and having an integrated throttle valve 47.

The displacer 10 consists, inter alia, of an outer bell 12, of a rolling piston 22 and of a tubular concertina 11 connecting the two parts. The outer bell 12 is a bush-like hollow body which consists of a tube with a cylindrical inner wall 13 and with an outwardly curved bottom.

The rolling piston 22 is a hollow body having a cylindrical outer wall 23 and carrying, for example at a free outer end, the housing 34 of the hydraulic accumulator 30. The hollow space forms a working line 40 which communicates with the fluid space 35 of the hydraulic accumulator 30. In the exemplary embodiment, for example, a threaded bolt 25 is located at the upper end of the rolling piston 22, by which threaded bolt the spring/damper system may be fastened to the vehicle body rigidly or flexibly via elastic intermediate elements.

The tubular concertina 11 is fastened between the rolling piston 22 and the outer bell 12. For this purpose, the upper end of the tubular concertina 11 open at the tube ends is pushed with the inner wall onto the lower end of the rolling piston 22 and is fixed, for example non-positively, in a non-slip and sealing manner with the aid of a tension ring 14.

In FIG. 1, the lower end of the tubular concertina 11 is fastened to an approximately cylindrical portion of an assembly-aid cap 15. For this purpose, before installation in the outer bell 12, the lower end of the tubular concertina 11 is pushed with the inner wall onto the outer contour of the assembly-aid cap 15 and is fixed, for example non-positively and positively, in a non-slip and sealing manner by a tension ring 24. After the assembly-aid cap 15 has been inserted into the outer bell 12, the outer wall of the concertina 11 bears against the inner wall 13 at least in the immediate vicinity of the cap. The assembly-aid cap 15 may be fastened in the outer bell 12.

In the ready-to-install state of the spring/damper system, the rolling piston 22 is seated in the outer bell 12 in such a manner that the upper end of the tubular concertina 11 is overturned inwardly to form an upwardly oriented meniscus 18. As a result, during each operationally induced relative movement between the parts 12 and 22, the outer wall 19 of the concertina 11 rolls on the outer wall 23 and the inner wall 13.

The meniscus 18 moves over the entire stroke range between the cylindrical walls 13 and 23. The mean radial distance between these walls is constant in the stroke range of the meniscus 19. The distance corresponds to a gap width which is at most five times the wall thickness of the tubular concertina 11. This allows a slender spring-strut configuration and keeps the load on the concertina 11 in the meniscus region low. Moreover, the internal friction in the tubular concertina 11 is constant over the entire stroke.

The outside diameter of the rolling piston is in this case, for example, approximately equal to or smaller than the useful overall stroke of the spring strut.

The length of the tubular concertina corresponds, for example, to twice the concertina diameter.

If appropriate, the outer bell may be produced so as to be widened in the lower region, i.e. in or in the vicinity of the assembly-aid cap 15. In this case, such a widening lies outside the meniscus stroke range. During compression, the widening prevents a major angular deviation between the center line of the outer bell 12 and the center line of the rolling piston 22, without the concertina wall 20 which bears against the rolling piston 22 coming into contact with the concertina wall 20 supported on the outer bell 12.

The rear space 7 lying outside the concertina space 5 between the outer bell 12 and the rolling piston 22 is sealed against the penetration of dirt with the aid of an anti-dirt concertina 28. The rear space 7 is connected to the surroundings via a venting bore.

A pivoting joint 50 is arranged at the lower end of the outer bell 12. The spring/damper system is mounted on the chassis in an articulated manner via the pivoting joint 50. The pivoting joint 50, the pivot axis of which extends perpendicularly to the center line of the outer bell, consists of two bushes 51 and 53, between which, for example, an elastomeric body 52 is vulcanized in or glued in. The elastomeric body 52 may increase the articulation of the joint 50 by up to five degrees of freedom.

The outer bush 51 is welded directly to the outer body 12. The inner bush 53 serves, in the exemplary embodiment, for the fastening to the chassis.

Located in the upper region of the rolling piston 22 is a delivery line 17 which, if appropriate, is capable of being shut off and which issues into the working line 40. In use as an active spring/damper system or for leveling, fluid is supplied to or extracted from the displacer via the delivery line 17. Additional forces may be produced in a desired manner by the supply and discharge of a defined fluid quantity. The reception or removal of these additional quantities modifies the damper forces and the spring forces in the entire system.

The hydraulic accumulator 30 is configured, for example, as a bladder-type or diaphragm-type accumulator. A gas cushion 32 divided off by the bladder or diaphragm 31 forms the springing of the spring/damper system. Two pressure-stage valves acting in opposition to one another and taking the form of spring-plate valves are located at the transition from the working line 40 to the housing 34 of the hydraulic accumulator 30. Each valve 47 opens in a different direction of flow from the other. In this example, the throttle action of the individual throttle non-return valve 47 may be designed, if appropriate, to be adjustable by a controllable or regulatable drive.

In other configurations, the length of the working line 40 may be reduced to a perforation, for example when fluid-carrying components of the displacer project into the hydraulic accumulator or are surrounded by this. For example, the outer bell 12 may be surrounded by a, for example, annular housing. In such a configuration, the total annular space located between the housing and the outer contour of the outer bell is divided into an inner and an outer annular space by a tube-like diaphragm. The outer annular space is filled with gas, while the inner annular space, comparable to the fluid space 35 from FIG. 1, communicates with the concertina space 5 via at least one throttle valve.

Fluid 1 used in the spring/damper system is, for example, a solution of water and alcohol. All alcohols which are miscible with water in any desired ratio at room temperature are suitable for this solution. For example, a water/ethanol solution or a water/glycol solution is used. A conventional water/glycol solution, such as is also used as anti-freeze cooling fluid in internal combustion engines, has, for example, an ethylene glycol fraction of 33 to 50%. Where the 50% solution is concerned, it is possible for the spring/damper system to operate down to a temperature of −35° Celsius. Moreover, this solution does not attack the conventional elastomeric materials. Rubber swelling is also on the order of the swelling which occurs in pure water.

Alternatively to the example embodiment described above, a spring/damper system may be provided, in which the fluid 1 for the system is a magnetorheological fluid. If, for example, a short annular portion on the hydraulic working line 40 is surrounded by a current-excited magnet coil, the excited magnet coil, in combination with the fluid 1, constitutes a variable throttle point. With an increasing application of current to the coil, the flow velocity decreases due to an increase in the apparent or dynamic viscosity in the working line 40, as a result of which, inter alia, the damping behavior of the entire system may be modified in a specific manner.

What is claimed is:

1. A combined spring/damper system for support of at least one of wheel suspensions and axles on a vehicle body, comprising:

an outer bell having a cylindrical inner-wall region;

a rolling piston having a cylindrical outer-wall region and a meniscus guided on the cylindrical inner-wall region of the outer bell and the cylindrical outer-wall region of the rolling piston; and a tubular concertina arranged between one of a wheel-carrying and wheel-guiding tie-up and a tie-up located on a vehicle-body side and mounted between the outer bell and the rolling piston;

wherein one of the outer bell and the rolling piston is mounted on the vehicle body in one of a rigid and flexible manner via elastic intermediate members;

wherein one of the outer bell and the rolling piston is mounted on one of a chassis side and the vehicle-body side via a joint including at least one degree of pivoting freedom;

wherein a concertina space is filled with a fluid and communicates with a hydraulic accumulator mounted on one of the chassis side and vehicle side; and wherein a gap width between the cylindrical outer-wall of the rolling piston and the cylindrical inner-wall of the outer bell corresponds to at most five times a wall thickness of a rolling tubular portion of the tubular concertina.

2. A combined spring/damper system for support of at least one of wheel suspensions and axles on a vehicle body, comprising:

an outer bell having a cylindrical inner-wall region;

a rolling piston having a cylindrical outer-wall region and a meniscus guided on the cylindrical inner-wall region of the outer bell and the cylindrical outer-wall region of the rolling piston; and a tubular concertina arranged between one of a wheel-carrying and wheel-guiding tie-up and a tie-up located on a vehicle-body side and mounted between the outer bell and the rolling piston;

wherein one of the outer bell and the rolling piston is mounted on the vehicle body in one of a rigid manner and a flexible manner via elastic intermediate members;

wherein one of the outer bell and the rolling piston is mounted on one of a chassis side and the vehicle-body side via a joint including at least one degree of pivoting freedom;

wherein a concertina space is filled with a fluid and communicates with a hydraulic accumulator mounted on one of the chassis side and vehicle side; and wherein a length of the tubular concertina is twice a diameter of the tubular concertina.

3. A combined spring/damper system for support of at least one of wheel suspensions and axles on a vehicle body, comprising:

an outer bell having a cylindrical inner-wall region;

a rolling piston having a cylindrical outer-wall region and a meniscus guided on the cylindrical inner-wall region of the outer bell and the cylindrical outer-wall region of the rolling piston;

a tubular concertina arranged between one of a wheel-carrying and wheel-guiding tie-up and a tie-up located on a vehicle-body side and mounted between the outer bell and the rolling piston; and an assembly-aid cap arranged in the outer bell and having an approximately cylindrical portion to fasten a lower end of the tubular concertina;

wherein one of the outer bell and the rolling piston is mounted on the vehicle body in one of a rigid manner and a flexible manner via elastic intermediate members;

wherein one of the outer bell and the rolling piston is mounted on one of a chassis side and the vehicle-body side via a joint including at least one degree of pivoting freedom;

wherein a concertina space is filled with a fluid and communicates with a hydraulic accumulator mounted on one of the chassis side and vehicle side; and wherein the outer bell is configured to be widened in a lower region in a vicinity of the assembly-aid cap to prevent a major angular deviation between a center line of the outer bell and a center line of the rolling piston.

4. The combined spring/damper system according to claim 3, wherein the outer bell is mounted on one of a wheel-carrying and wheel-guiding component via a pivoting joint.

5. The combined spring/damper system according to claim 3, wherein the hydraulic accumulator includes one of a diaphragm accumulator and a bladder accumulator.

6. The combined spring/damper system according to claim 3, wherein one of at least one throttle point and at least two throttle non-return valves are arranged between the concertina space and the hydraulic accumulator.

7. The combined spring/damper system according to claim 6, wherein the throttle non-return valves include pressure-stage valves.

8. The combined spring/damper system according to claim 3, wherein the fluid includes a water/alcohol solution.

9. The combined spring/damper system according to claim 3, wherein the concertina space is connected to an external fluid supply via a delivery line to produce an active spring/damper system when in a driving situation.

10. The combined spring/damper system according to claim 3, wherein the system has an effective piston area which is invariable over a chassis stroke.

11. The combined spring/damper system according to claim 3, wherein an internal friction of the tubular concertina is constant over an entire chassis stroke.

12. The combined spring/damper system according to claim 3, further comprising:

an assembly-aid cap arranged in the outer bell and having an approximately cylindrical portion to fasten a lower end of the tubular concertina.

13. The combined spring/damper system according to claim 3, further comprising:

an anti-dirt concertina to seal off a space between the outer bell and the rolling piston against a penetration of dirt.

14. The combined spring/damper system according to claim 3, wherein a pivot axis of the joint is essentially perpendicular to a center line of the outer bell.

15. The combined spring/damper system according to claim 3, wherein the joint includes an outer bush coupled directly to the outer bell and an inner bush coupled to the chassis.

16. The combined spring/damper system according to claim 3, wherein the fluid is a magnetorheological fluid.

17. The combined spring/damper system according to claim 3, wherein the tubular concertina is fastened to the rolling piston and the outer bell.

18. The combined spring/damper system according to claim 3, wherein the tubular concertina includes an upper end that is overturned inwardly to form the meniscus.

* * * * *